United States Patent Office 3,045,414
Patented July 24, 1962

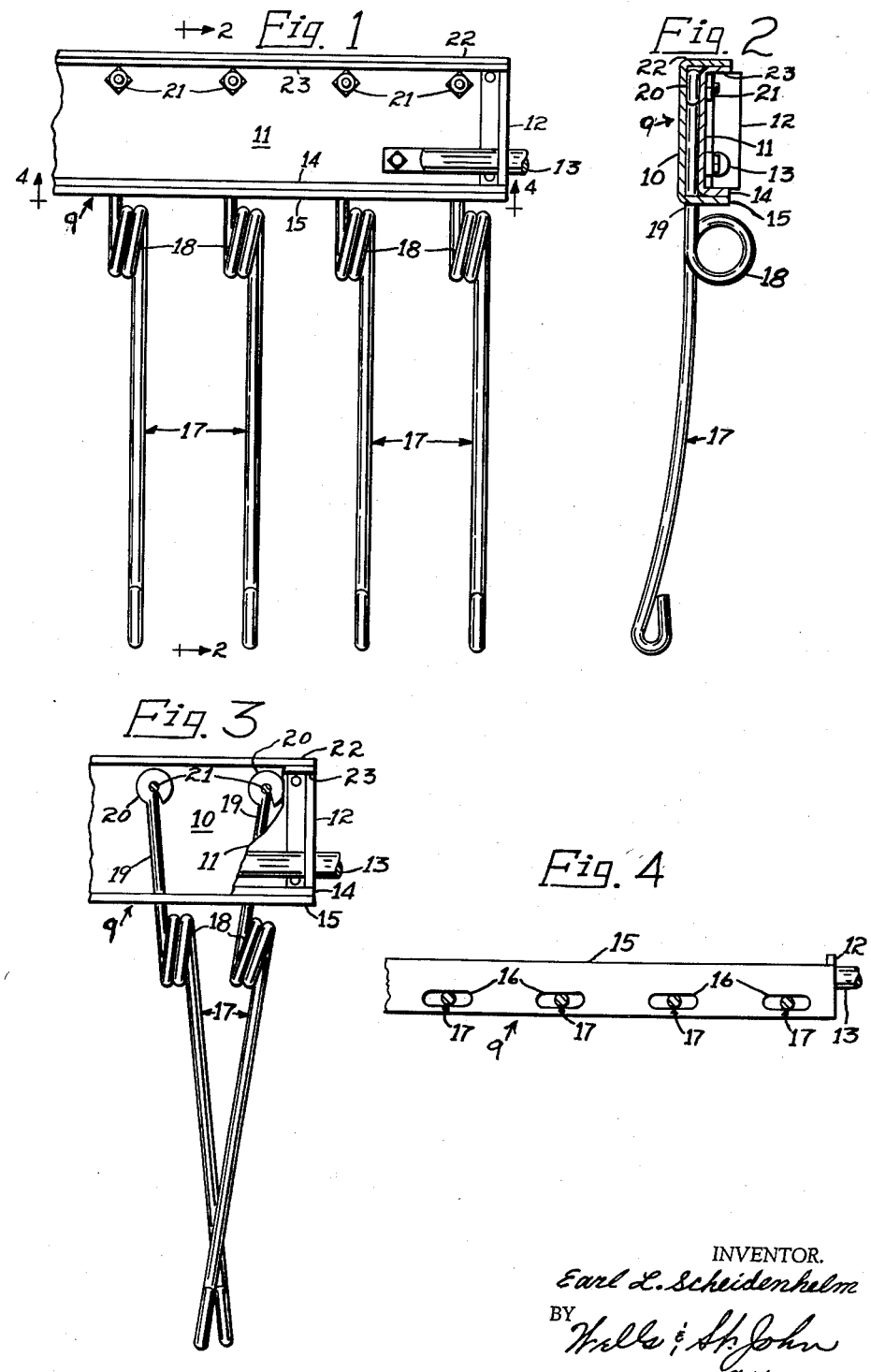

3,045,414
REEL FINGER
Earl L. Scheidenhelm, Mendota, Ill., assignor to
Horace D. Hume, Mendota, Ill.
Filed Jan. 23, 1961, Ser. No. 84,081
5 Claims. (Cl. 56—221)

This invention relates to a novel reel finger and bat assembly for use on harvester reels.

The particular invention disclosed herein is designed for use on harvester reels when harvesting fragile crops such as tomatoes, which grow in non-uniform positions on the supporting vines. The bat and tine construction is adapted for use on a harvester reel such as that shown in Patent No. 2,644,289, issued to H. D. Hume on July 7, 1953. The instant time was particularly designed for use on this type of reel used in conjunction with a tomato harvester.

In harvesting of crops such as tomatoes which have considerable bulk and which are non-uniformly spaced on the vines which support them, it is necessary to provide some yieldable type of support for harvester tines used to grasp the vines. If the tines are fixed to the reel bats of the harvester reel the fruit stands in danger of being injured by the force of the tines contacting them. According to the present invention the tines are pivotally mounted on the reel bats for transverse pivotal movement to thereby circumvent the fruit and grasp the vines as desired. In this manner damage to the fruit is eliminated while retaining the advantage of a spring mounted tine which can be used to bring the vines to the harvesting machine.

It is the first object of this invention to provide a bat and tine arrangement which will protect fragile fruit being harvested from the danger of being damaged by the force of the contacting tines.

It is a second object of this invention to provide the above protection while retaining the valuable qualities of a spring mounted tine which resists backward movement due to the resistance of the vines or crops being harvested. The present invention contemplates the use of tines which are spring biased for movement toward the harvesting machine.

These and further objects will be evident from a study of the accompanying drawings and the following disclosure which details one embodiment of the present invention. Other embodiments will be obvious to those skilled in the art and for this reason the following disclosure is not to limit the invention, except as it is limited by the claims which follow it.

In the drawings:

FIGURE 1 is a rear view of a bat constructed according to the present invention with the tines in place, the tine shaft being broken away and the left hand portion of the bat construction being also broken away;

FIGURE 2 is a sectional view taken along line 2—2 in FIGURE 1;

FIGURE 3 is a view somewhat similar to FIGURE 1 showing only two of the tines with the right hand side and with a portion of the back plate broken away to show the pivotal connections of the two tines, the tines being shown in crossed positions; and FIGURE 4 is a sectional view taken along line 4—4 of FIGURE 1.

In the design of a tomato harvester, the problem arises as to the protection of the fruit on the vine during the grasping of the vines by a conventional harvester reel. The problem exists due to the location of the fruit on the vines. The distribution of fruit is not uniform. The fragile character of the fruit makes it particularly susceptible to damage by impact. In order to obviate the problem it has been found necessary to provide some sort of yieldable character in the tine which contacts the vines and fruit. This yieldability is provided according to the present invention in a bat and tine arrangement which is readily adaptable to the present reels such as that described in the patent to Hume, cited above.

Referring now to the drawings, the bat 9 consists of a rear transverse channel 11 and a front transverse channel 10.

The term "rear" is used to designate the back side of the bat 9 as it approaches the vines being harvested at the lower elevation of the reel while the term "front" is used to designate the approaching side of the bat 9. The front and rear channels 10 and 11 are rigidly spaced by end plates 12 at each end of the bat 9. Fixed to the rear channel 11 is a tine shaft 13 which is rotatably mounted by the reel frame in the usual fashion as shown in the Hume patent. The tine shaft 13, as shown, consists of two independent portions, one being at each end of the bat 9. The only important relation between the tine shaft 13 and the bat 9 is that the tine shaft 13 must be fixed relative to the channels 10 and 11. Tine shaft 13 is used to control the angular disposition of the channels 10 and 11 in respect to the ground so as to maintain them in a constant angular position at all times.

The rear channel 11 is shown having a rear ledge 14 bent perpendicularly along its lower horizontal edge and a second ledge 23 bent similarly along its upper horizontal edge. The ledge 14 is secured to a similar rear ledge 15, formed along the corresponding horizontal edge of the front channel 10 and ledge 22 is secured to the upper ledge 23 on channel 11. Cut through the ledge 15 is a series of longitudinal slots 16 which are aligned adjacent to the inner surface of the front channel 10.

The tines used in this combination consist of a lower curved finger 17 terminating at its bottom end in an upwardly curved loop. The tines further comprise a spring coil 18 formed integrally with finger 17 at the upper end thereof and a straight shank extending from the spring coil 18 and designated by the numeral 19. The shank 19 terminates in a loop 20 which is coiled about an axis perpendicular to the axis of the spring coil 18. The shank 19 is designated to loosely fit within the slots 16, each tine being individually mounted within one of the slots 16. The loop 20 is pivotally carried by a bolt assembly 21 which is mounted in a fixed position by the two plates 10 and 11. The bolt assembly 21 thereby pivotally mounts the tines about its own axis to thereby allow sideward movement of the lower end of each tine.

The operation of this device can be seen best in FIGURE 3 which shows the tines in crossed positions, the fingers 17 being at their maximum sideward positions in opposite directions. This will occur in practice when adjacent tines contact fruit on the vine which causes the tines to swing to the side. The tines will become uncrossed by subsequent engagement with vines or by manual adjustment when necessary. The tines are freely movable within the slots 16 which limit their sideward movement. The tines are restricted only by the pivotal axis of the bolt assemblies 21. It is important to note that the tines are located directly adjacent the inner vertical surfaces of both channels 10 and 11 so as to provide adequate backing for the shanks 19 of the tines. This is necessary in order to provide adequate reaction forces to support the coil 18 which is used to exert forward pressure on the vines being harvested in order to urge them into the harvesting machine. It is imperative in such applications that forward spring force be retained in conjunction with the sideward yieldability of the tine. The disclosed construction provides a smooth non-fouling front surface for the reel bats.

It has been found that this bat and tine arrangement results in adequate protection of fragile fruits such as tomatoes. The tines readily adapt themselves to the changing crop conditions and thereby protect the fragile fruit being harvested. In addition the tines, by using spring coils 18, provide substantial push between the reel and the vines to insure their introduction into the harvesting machine.

Various modifications may be evident to one skilled in this field after studying the above disclosure. For this reason the given embodiment is to be considered as merely exemplary and is not to limit or restrict the invention except as it is defined below.

Having thus described my invention, I claim:

1. A bat assembly for harvester reels wherein the bats approach the crop being harvested in a forwardly directed motion, comprising:

transverse means having an integral rearwardly directed ledge including a plurality of transverse slots formed through said ledge;

a transverse tine shaft fixed to said transverse means adapted to mount said means on a reel frame;

a plurality of individual tines extending through said apertures in individual spaced positions along said transverse means;

and mounting means fixed to said transverse means and operatively connected to said tines adapted to pivotally mount each tine about an axis perpendicular to said transverse means and spaced from said slotted ledge.

2. A bat assembly for harvester reels wherein the bats approach the crop being harvested in a forwardly directed motion, comprising:

a transverse channel having a rear channel surface and upper and lower rearwardly projecting ledges;

a plurality of transverse slotted apertures formed through the lower edge of said channel adjacent its rear surface;

a plurality of tines individually located within each of said slotted apertures;

and individual mounting means secured to said channel above said lower ledge adapted to pivotally support the upper ends of each of said tines adjacent the rear channel surface for pivotal motion about an axis perpendicular to the plane of said rear channel surface and vertically spaced above the center of each respective slot.

3. The invention as defined in claim 2 wherein said ledge is integral with said channel and further comprising;

a second channel parallel to said first named channel, said second channel being located adjacent said tines and above said ledge, said second channel being operatively connected to said first named channel by said mounting means.

4. The invention as defined in claim 2 wherein said tines each comprise a downwardly extended finger terminating at its upper end in a coiled loop located adjacent said ledge, and further including a straight shank extending upwardly from said loop, through said slotted aperture and to said mounting means.

5. A bat assembly for harvester reels wherein the bats approach the crop being harvested in a forwardly directed motion, comprising:

a first transverse channel;

a second transverse channel;

means rigidly joining said first and second channels in spaced parallel relation;

a horizontal transverse tine shaft fixed with respect to said first and second channels adapted to mount said channels on a reel frame;

a perpendicular ledge bent integrally along the lower horizontal edge of said first channel;

a plurality of spaced longitudinal apertures formed through said ledge;

a plurality of tines individually mounted within each of said apertures;

each of said tines including a downwardly extended finger, an integral coil adjacent said ledge and an integral straight shank extending vertically through said slotted aperture and terminating in a loop having an axis perpendicular to the axis of its coil;

and means joined between said first and second channels and passing through said loop, said means being adapted to pivotally carry said tine for movement about an axis perpendicular to said first and second channels and limited by said slots.

References Cited in the file of this patent

UNITED STATES PATENTS

| | | |
|---|---|---|
| 1,145,963 | Bame | July 13, 1915 |
| 2,040,689 | Duhain | May 12, 1936 |
| 2,423,772 | Haase | July 8, 1947 |
| 2,492,881 | Oehler et al. | Dec. 27, 1949 |
| 2,644,289 | Hume | July 7, 1953 |
| 2,811,008 | Plant | Oct. 29, 1957 |